(12) United States Patent
Takada et al.

(10) Patent No.: US 10,636,595 B2
(45) Date of Patent: Apr. 28, 2020

(54) OPERATION DEVICE

(71) Applicant: DENSO TEN Limited, Kobe-shi, Hyogo (JP)

(72) Inventors: Kengo Takada, Kobe (JP); Toshiya Shirota, Kobe (JP); Masao Ohtani, Kobe (JP)

(73) Assignee: DENSO TEN LIMITED, Kobe-shi (JP)

(*) Notice: Subject to any disclaimer, the term of this patent is extended or adjusted under 35 U.S.C. 154(b) by 12 days.

(21) Appl. No.: 15/909,433

(22) Filed: Mar. 1, 2018

(65) Prior Publication Data

US 2018/0330902 A1 Nov. 15, 2018

(30) Foreign Application Priority Data

May 10, 2017 (JP) .................. 2017-093853

(51) Int. Cl.
| | |
|---|---|
| *H01H 25/00* | (2006.01) |
| *B60K 37/06* | (2006.01) |
| *H01H 9/16* | (2006.01) |
| *H01H 25/06* | (2006.01) |
| *B60K 35/00* | (2006.01) |
| *H01H 11/00* | (2006.01) |
| *H01H 19/14* | (2006.01) |

(52) U.S. Cl.
CPC ......... *H01H 25/008* (2013.01); *B60K 35/00* (2013.01); *B60K 37/06* (2013.01); *H01H 9/16* (2013.01); *H01H 25/065* (2013.01); *B60K 2370/126* (2019.05); *B60K 2370/139* (2019.05); *B60K 2370/1446* (2019.05); *H01H 9/161* (2013.01); *H01H 19/14* (2013.01); *H01H 2011/0081* (2013.01); *H01H 2229/046* (2013.01)

(58) Field of Classification Search
CPC .... H01H 25/008; H01H 25/065; H01H 19/14; B60K 37/06; B60K 2370/126
USPC .................................. 200/4, 316, 336, 564
See application file for complete search history.

(56) References Cited

U.S. PATENT DOCUMENTS

| | | | | |
|---|---|---|---|---|
| 2007/0114114 | A1* | 5/2007 | Park ................... | G05G 9/04796 200/4 |
| 2014/0262701 | A1* | 9/2014 | Heater ..................... | G05G 1/08 200/4 |
| 2018/0130619 | A1* | 5/2018 | Neese .................... | H01H 19/14 |

FOREIGN PATENT DOCUMENTS

| | | |
|---|---|---|
| JP | 2004-079484 A | 3/2004 |
| JP | 2006-228452 A | 8/2006 |
| JP | 2007-053061 A | 3/2007 |

\* cited by examiner

*Primary Examiner* — Edwin A. Leon
*Assistant Examiner* — Lheiren Mae A Caroc
(74) *Attorney, Agent, or Firm* — Oliff PLC

(57) ABSTRACT

There is provided an operation device. An operation knob rotatable on an axial line, configured to include: a cylindrical base member extending in an axial direction; a cylindrical outer member disposed on an outer side in a radial direction of the base member; and an inner member disposed on an inner side in the radial direction of the base member. The cylindrical outer member has protruding parts extending inward in the radial direction and abutting on the inner member via through-holes formed through the base member in the radial direction.

12 Claims, 4 Drawing Sheets

OPERATION DEVICE

CROSS-REFERENCE TO RELATED APPLICATIONS

This application is based on and claims priority under 35 USC 119 from Japanese Patent Application No. 2017-93853 filed on May 10, 2017.

TECHNICAL FIELD

The present disclosure relates to an operation device.

BACKGROUND

Patent Document 1 discloses a switch device which can be mounted on an instrument panel of a vehicle and on which a dial operation can be performed. The switch device has a cylindrical dial installed on the outer circumference side of a cylindrical guide member so as to be rotatable with respect to the guide member. The dial is configured by combining a cylindrical dial base, a cylindrical decorative member, and a cylindrical elastic member. On the outer circumference side of the guide member, a rotary member is mounted such that the rotary member is rotatable, and the dial base is fixed to the outer circumference of the rotary member. The decorative member is fit on the dial base. The elastic member is interposed between the outer circumference of the dial base and the inner circumference of the decorative member.

[Patent Document 1] Japanese Patent Application Laid-Open No. 2007-53061

For example, in dial type operation devices which are applied to audio systems for vehicles, abnormal noise may be produced from fitting parts and the like due to vibration of the vehicles. In the configuration of Patent Document 1, the elastic member is interposed between the dial base and the decorative member. Therefore, backlash is unlikely to occur between the dial base and the decorative member. However, in the configuration of Patent Document 1, it is required to fit the elastic member into the decorative member and fit the dial base into the elastic member. For this reason, in the case of considering workability and the like, further improvement is desired.

SUMMARY

It is therefore an object of the present disclosure to provide an operation device having an operation knob in which abnormal noise is unlikely to occur.

According to an aspect of the embodiments of the present invention, there is provided an operation device including: an operation knob rotatable on an axial line, configured to include: a cylindrical base member extending in an axial direction; a cylindrical outer member disposed on an outer side in a radial direction of the base member; and an inner member disposed on an inner side in the radial direction of the base member. The cylindrical outer member has protruding parts extending inward in the radial direction and abutting on the inner member via through-holes formed through the base member in the radial direction.

In the operation device, one of the cylindrical base member and the inner member may have hook parts, and the other one may have hook fitting parts to be engaged with the hook parts.

In the operation device, the through-holes may be aligned with either the hook parts or the hook fitting parts in the axial direction.

In the operation device, the plurality of protruding parts may be arranged at intervals in a circumferential direction.

In the operation device, the cylindrical outer member may be a member softer than the cylindrical base member.

In the operation device, the through-holes may be injection holes for injecting a material to form the cylindrical outer member.

In the operation device, the inner member may be cylindrical.

In the operation device, the inner member may be a coated member made by performing a surface coating process.

In the operation device, inside the cylindrical base member, an annular surface to face an end surface of the inner member positioned on one side in the axial direction may be formed, and the annular surface may have an uneven pattern.

The operation device, may further include: an operation button disposed on the inner side of the inner member in the radial direction; and a support supporting the operation knob such that the operation knob is rotatable and supporting the operation button such that the operation button is movable in the axial direction.

In the operation device, the support may be an encoder.

In the operation device, the operation device may be an in-vehicle operation device.

According to the embodiments of the present invention, it is possible to provide an operation device having an operation knob in which abnormal noise is unlikely to occur.

BRIEF DESCRIPTION OF THE DRAWINGS

Exemplary embodiments of the present invention will be described in detail based on the following figures, wherein.

DETAILED DESCRIPTION

Figure 2:
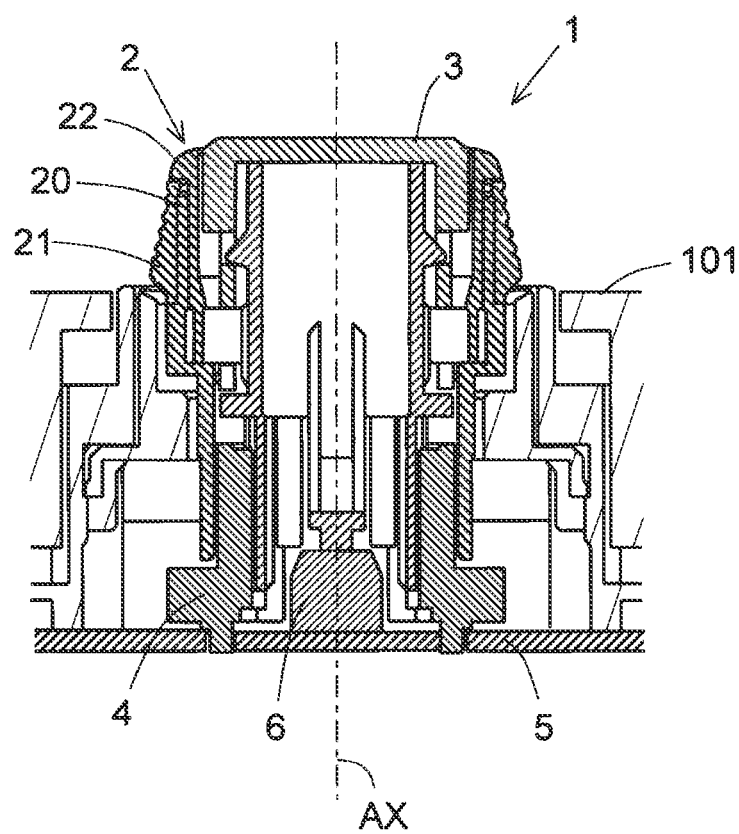
FIG. 2 is a schematic cross-sectional view taken at the position of a line A-A of FIG. 1.

Hereinafter, an operation device according to an embodiment of the present invention will be described in detail. In this specification, the extension direction of an axial line AX which is the center of rotation of an operation knob 2 shown in FIG. 2 is referred to as the axial direction. Also, a direction perpendicular to the axial line AX and a direction along an arc of a circle having the axial line AX as the center are referred to as the radial direction and the circumferential direction, respectively.

<1. Outline of Operation Device>

Figure 1:
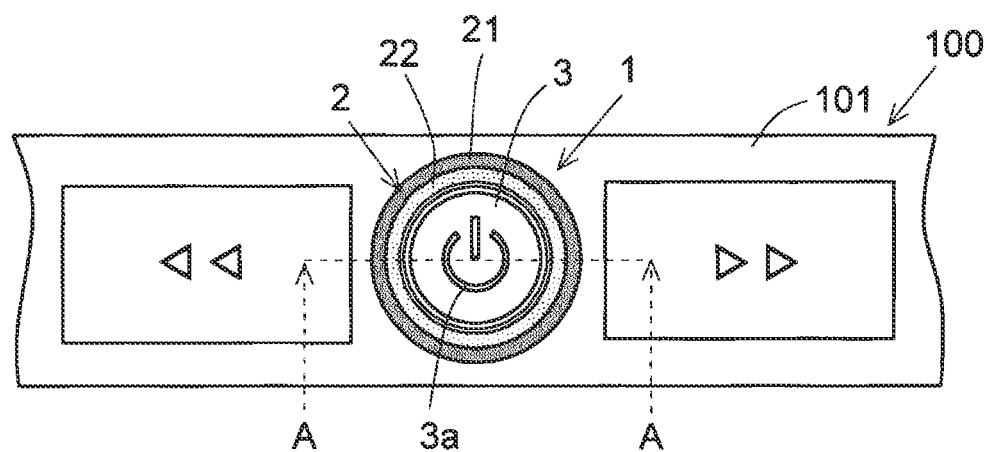
FIG. 1 is a plan view schematically illustrating an operation device as seen from the front.

FIG. 1 is a plan view schematically illustrating an operation device 1 according to an embodiment of the present invention as seen from the front. As shown in FIG. 1, specifically, the operation device 1 is incorporated in an operation unit 100. In the present embodiment, the operation unit 100 is, for example, an in-vehicle operation unit. In other words, the operation device 1 is, for example, an in-vehicle operation device. The operation device 1 may be, for example, an operation device of an audio system, a car navigation system, an air conditioner, a drive recorder, a radio, or the like. In the present embodiment, the operation device 1 is disposed at the central part of the front surface of the operation device 1. However, this is an example. The position of the operation device 1 in the operation unit 100 may be appropriately changed.

FIG. 2 is a schematic cross-sectional view taken at the position of a line A-A of FIG. 1. As shown in FIG. 1 and FIG. 2, the operation device 1 includes an operation knob 2, an operation button 3, and a support 4. A part of each of the operation knob 2 and the operation button 3 protrudes from the front surface of a housing 101 constituting the operation unit 100, and the other part is disposed inside the housing 101. The support 4 is stored in the housing 101.

The operation knob 2 is a rotary knob having a cylindrical shape. The operation knob 2 rotates on the axial line AX. Also, in FIG. 1, the axial line AX extends in a direction perpendicular to the drawing sheet. The operation knob 2 is usable, for example, for control on the volume, switching of the screen, selecting of functions, or the like. In other words, by rotating the operation knob 2, it is possible to perform changing of the volume, switching of the display screen, or the like. Details of the operation knob 2 will be described below.

The operation button 3 is disposed on the inner side of the operation knob 2 in the radial direction. The operation button 3 has a cylindrical shape as seen in a plan view taken as seen from the axial direction. In the present embodiment, the operation button 3 is composed of three parts. However, the operation button 3 may be composed of one part. The operation button 3 is installed so as to be movable in the axial direction. It is preferable that a clearance be provided between the operation knob 2 and the operation button 3. In this case, the operation knob 2 can smoothly rotate without getting caught on the operation button 3. The operation button 3 can smoothly move in the axial direction without getting caught on the operation knob 2.

In the present embodiment, the operation button 3 is, for example, a power button. By pressing one end surface of the operation button 3 in the axial direction (the end surface on the front surface side), it is possible to turn on or off the power of, for example, an audio system, a car navigation system, or the like. Also, the operation button 3 may not be a power button, and may be any other button, for example, a button which can be pressed to confirm set conditions.

On the one end surface of the operation button 3 in the axial direction, a light transmissive part 3a which transmits light is provided. The shape of the light transmissive part 3a may be, for example, characters, a figure, or a symbol. In the present embodiment, the shape of the light transmissive part 3a is a symbol representing the power button. When the surroundings are dark, for example, at night, light from a light source unit (not shown in the drawings) passes through the light transmissive part 3a, such that a user can recognize the symbol representing the power button. Therefore, even in a dark environment, the user can easily grasp the position of the operation button 3 and operate the operation knob 2 and the operation button 3. Also, in the present embodiment, turning on and off of the light source unit is performed independently from turning on and off of the power by the operation button 3. Turning on and off of the light source unit is performed, for example, in conjunction with turning on and off of lights of a vehicle.

The support 4 supports the operation knob 2 such that the operation knob can rotate. The support 4 supports the operation button 3 such that the operation button can move in the axial direction. According to the present embodiment, since both of the operation knob 2 and the operation button 3 are supported by the support 4, it is possible to downsize the operation device 1 and the operation unit 100. In the present embodiment, the support 4 is cylindrical. The operation knob 2 is disposed on the outer side of the support 4 in the radial direction. Specifically, the operation knob 2 is fit on a rotary part of the support 4. The rotary part rotates on the axial line AX. The operation knob 2 rotates together with the rotary part. The operation button 3 is disposed on the inner side of the support 4 in the radial direction. Specifically, the operation button 3 is supported so as to be slidable in the axial direction with respect to the support 4.

In the present embodiment, the support 4 is an encoder. Since the support 4 is configured with an encoder, it is possible to measure the rotation angle of the operation knob 2, and it is possible to accurately grasp the rotation amount of the operation knob 2. Since the support 4 is configured with an encoder, it is possible to efficiently dispose in a narrow space between the operation knob 2 and the operation button 3.

However, the support 4 may not be an encoder. In this case, for example, a detector such as a light sensor for detecting rotation of the operation knob 2 may be installed separately from the support 4. In this case, it is possible to detect the rotation amount of the operation knob 2.

Further, the operation device 1 includes a circuit board 5 and a switch unit 6 as shown in FIG. 2. In the present embodiment, the circuit board 5 is disposed on the rear surface side of the operation unit 100. The support 4 is disposed on the circuit board 5, and is electrically connected to the circuit board 5. The switch unit 6 is turned on and off by movement of the operation button 3 in the axial direction. The switch unit 6 is disposed on the circuit board 5, and is electrically connected to the circuit board 5. The switch unit 6 is disposed on the inner side of the support 4 in the radial direction. If the user presses the operation button 3, a part of the operation button 3 presses the switch unit 6. By this pressing, the switch unit 6 is switched between an ON state and an OFF state. The switch unit 6 has elasticity, and if the user removes the force pressing the operation button 3, the operation button 3 is pushed back by the switch unit 6. In other words, a switch of the switch unit 6 is released from the pressed state.

<2. Details of Operation Knob>

Figure 3:
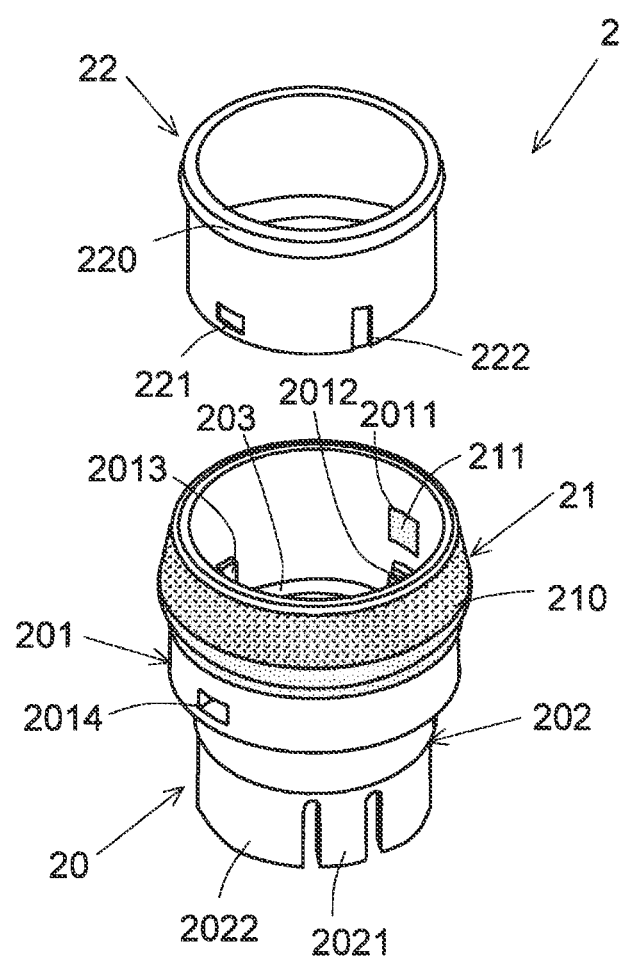
FIG. 3 is an exploded perspective view schematically illustrating an operation knob.
Figure 4:
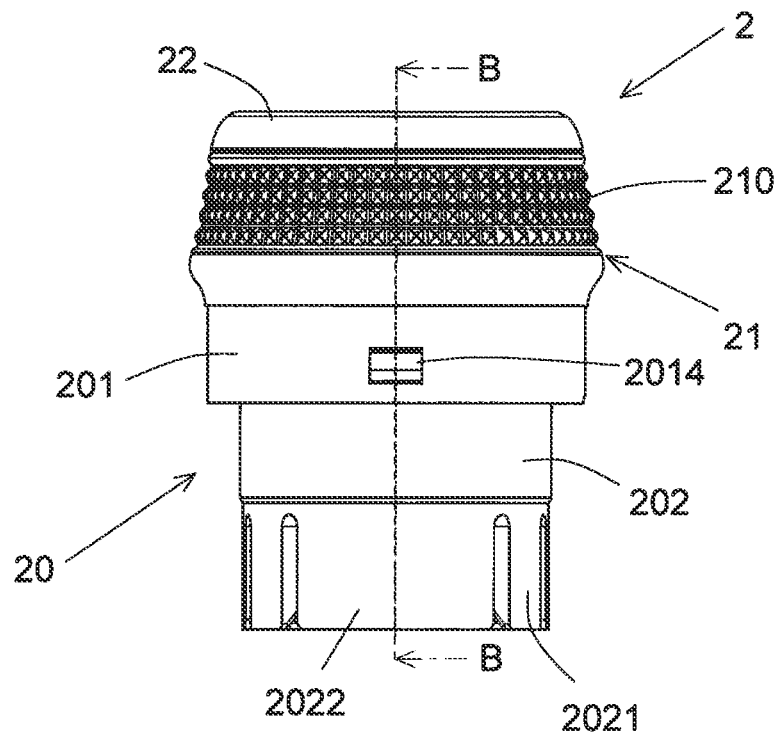
FIG. 4 is a side view schematically illustrating the operation knob.
Figure 5:
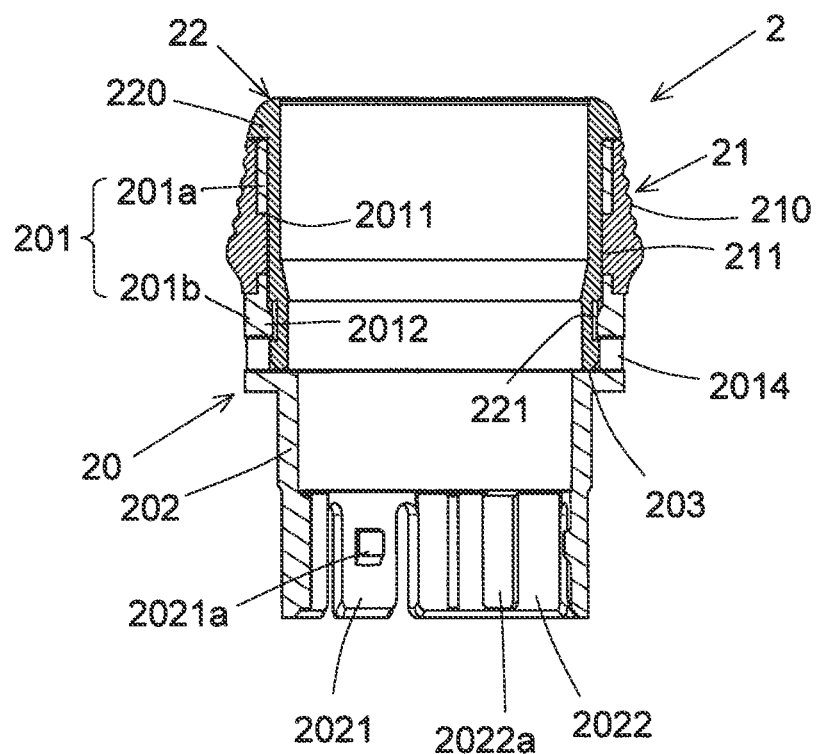
FIG. 5 is a schematic cross-sectional view taken at the position of a line B-B of FIG. 4.

FIG. 3 is an exploded perspective view schematically illustrating the operation knob 2 according to the embodiment of the present invention. FIG. 4 is a side view schematically illustrating the operation knob 2 according to the embodiment of the present invention. FIG. 5 is a schematic cross-sectional view taken at the position of a line B-B of FIG. 4. Also, FIG. 2 and FIG. 5 are different from each other in the cutting positions of the operation knob 2.

As shown in FIG. 3 to FIG. 5, the operation knob 2 includes a base member 20, an outer member 21, and an inner member 22. Also, in the exploded perspective view shown in FIG. 3, the base member 20 and the outer member 21 are shown as one body, not as exploded parts.

The base member 20 is a cylindrical member extending in the axial direction. In the present embodiment, the base member 20 is made of a resin. The base member 20 may be made of, for example, ABS resin. Specifically, the base member 20 includes a first cylindrical part 201 and a second cylindrical part 202 which are aligned in the axial direction.

The first cylindrical part 201 is positioned on one side (the front side) of the second cylindrical part 202 in the axial direction. The second cylindrical part 202 is positioned on the other side (the rear side) of the second cylindrical part 202 in the axial direction. The centers of the first cylindrical part 201 and the second cylindrical part 202 coincide with the axial line AX. The inside diameter of the first cylindrical part 201 is larger than the inside diameter of the second cylindrical part 202. Inside of the base station control unit 112, an annular surface 203 is formed. The annular surface 203 is formed due to the difference in the inside diameter between the first cylindrical part 201 and the second cylindrical part 202, and is positioned at the boundary part of the first cylindrical part 201 and the second cylindrical part 202.

In the present embodiment, more specifically, as shown in FIG. 5, the first cylindrical part 201 has a thin part 201a and a thick part 201b aligned in the axial direction. The thin part 201a is positioned on one side (the front side) of the thick part 201b in the axial direction. The thick part 201b is positioned on the other side (the rear side) of the thin part 201a in the axial direction. The thickness of the thin part 201a in the radial direction is smaller than that of the thick part 201b. The outside diameter of the thin part 201a is smaller than the outside diameter of the thick part 201b.

In the thin part 201a, through-holes 2011 are formed through the thin part in the radial direction. In other words, the through-holes 2011 is formed through the base member 20 in the radial direction. In the present embodiment, two through-holes 2011 are formed. The two through-holes 2011 are disposed at an interval of 180 degrees in the circumferential direction. However, the number of through-holes 2011 is not limited to two. It is preferable that the number of through-holes 2011 be two or more, and it is more preferable that the number of through-holes be an even number. It is preferable that the size of the through-holes 2011 be not too large, and it is preferable that the number of through-holes be not too large. It is preferable that the number of through-holes 2011 be four or smaller. It is preferable that a plurality of through-holes 2011 be disposed at regular intervals in the circumferential direction. The shape of the through-holes 2011 is not particularly limited, and may be, for example, a rectangular shape or a circular shape as seen in a plan view taken as seen from the radial direction. In the present embodiment, the through-holes 2011 are rectangular as seen in a plan view taken as seen from the radial direction.

On the inner circumferential surface of the thick part 201b, hook parts 2012 are formed so as to protrude inward in the radial direction. In other words, the base member 20 has the hook parts 2012. In the present embodiment, the through-holes 2011 and the hook parts 2012 are aligned in the axial direction. The hook parts 2012 are positioned on the other side of the through-holes 2011 in the axial direction. As described above, the number of through-holes 2011 is two, and the number of hook parts 2012 is also two. The two hook parts 2012 are disposed at an interval of 180 degrees in the circumferential direction. By the way, the through-holes 2011 and the hook parts 2012 may not be aligned in the axial direction. However, the configuration in which the through-holes 2011 and the hook parts 2012 are aligned in the axial direction makes it possible to simplify the structure of a mold for molding a resin into the base member 20. The number of hook parts 2012 is not limited to two. It is preferable that the number of hook parts 2012 be two or more, and it is more preferable that the number of hook parts be an even number. It is preferable that a plurality of hook parts 2012 be disposed at regular intervals in the circumferential direction.

As shown in FIG. 3, on the inner circumferential surface of the thick part 201b, first ribs 2013 are formed so as to protrude inward in the radial direction and extend in the axial direction. In the present embodiment, the first ribs 2013 extend from the other end part of the thick part 201b in the axial direction toward the one end part of the thick part in the axial direction. However, the first ribs 2013 may extend to the thin part 201a. In the present embodiment, two first ribs 2013 are formed. The two first ribs 2013 are disposed at an interval of 180 degrees in the circumferential direction. Each of the two first ribs 2013 is disposed between the two hook parts 2012. However, the number of first ribs 2013 is not limited to two, and the number of first ribs may be appropriately changed.

In the thick part 201b, openings 2014 are formed through the thick part in the radial direction. The openings 2014 and the hook parts 2012 are aligned in the axial direction. Specifically, the openings 2014 are formed on the other side of the hook parts 2012 in the axial direction. In the present embodiment, two openings 2014 are formed. The number of openings 2014 may be changed according to the number of hook parts 2012. Also, in some cases, the openings 2014 may not be formed. In place of the openings 2014, recesses may be formed so as to be hollow from the inner circumferential surface of the thick part 201b toward the outer side in the radial direction.

The second cylindrical part 202 has a plurality of leg parts formed on the other side in the axial direction and usable for mounting the base member 20 on the rotary part of the support 4. Specifically, the plurality of leg parts includes first leg parts 2021 and second leg parts 2022. Since the plurality of types of leg parts is formed, it is possible to provide a plurality of functions to the leg parts. The width of the first leg parts 2021 in the circumferential direction is smaller than that of the second leg parts 2022. The first leg parts 2021 and the second leg parts 2022 are disposed alternately at intervals in the circumferential direction. In present embodiment, both of the numbers of first leg parts 2021 and second leg parts 2022 are three. However, the numbers of them may be changed. The three first leg parts 2021 are arranged at intervals of 120 degrees in the circumferential direction, and the three second leg parts 2022 are arranged in the same way.

The first leg parts 2021 have locking protrusions 2021a formed on their inner circumferential surfaces so as to protrude inward in the radial direction. For example, the locking protrusions 2021a are engaged with locking holes or locking recesses (not shown in the drawings) formed in the support 4. In other words, by the first leg parts 2021, it is possible to couple the operation knob 2 to the support 4. Since the first leg parts 2021 have a small width in the circumferential direction, they are flexible. Therefore, it is possible to easily couple and remove the operation knob 2 to and from the support 4.

The second leg parts 2022 have second ribs 2022a formed on their inner circumferential surfaces so as to protrude inward in the radial direction and extend in the axial direction. For example, the second ribs 2022a are engaged with locking grooves (not shown in the drawings) formed in the rotary part of the support 4. In other words, by the second leg parts 2022, it is possible to determine the position of the operation knob 2 relative to the rotary part of the support 4 in the circumferential direction.

The outer member 21 is a cylindrical member which is disposed on the outer side of the base member 20 in the radial direction. The outer member 21 extends in the axial direction. In the present embodiment, the outer member 21 is disposed on the outer side of the thin part 201a in the radial direction. Most of the outer member 21 is positioned outside the housing 101. The outer member 21 is a member softer than the base member 20. Specifically, the outer member 21 is made of an elastomer. When operating the operation knob 2, the user touches the outer member 21 and operates the operation knob 2. By making the outer member 21 of an elastomer, it is possible to make it harder for a hand to slip from the operation knob 2 during a rotation operation. Also, in the present embodiment, at a part of the outer surface of the outer member 21, uneven parts 210 having irregularity are formed over the periphery in the circumferential direction. In the present embodiment, the uneven parts 210 are arranged regularly. By the uneven parts 210, it is possible to improve the slipping resistance function.

The base member 20 and the outer member 21 are made of different materials. Therefore, the base member 20 and the outer member 21 can be formed by two-color molding (double molding). In other words, the outer member 21 can be integrated with the base member 20 by two-color molding. In the present embodiment, the base member 20 and the outer member 21 are formed by two-color molding. Therefore, it is not required during manufacturing to manually fit the outer member 21 into the base member 20, and thus it is possible to improve the work efficiency during manufacturing.

In two-color molding, the base member 20 is formed by injection molding using a common mold and a primary mold. Thereafter, the primary mold is replaced with a secondary mold, and a melted elastomer to form the outer member 21 is filled in the secondary mold. The filled elastomer solidifies, whereby the outer member 21 is formed integrally with the base member 20.

Figure 6:
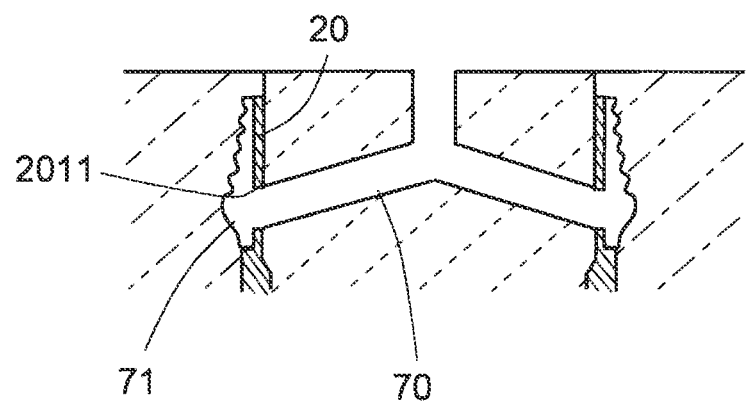
FIG. 6 is a schematic diagram illustrating a state in two-color molding before an elastomer is filled.
Figure 7:
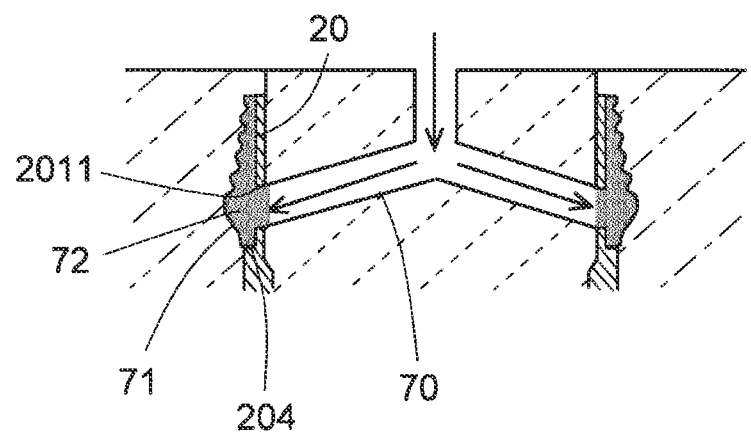
FIG. 7 is a schematic diagram illustrating a state in two-color molding where the elastomer has been filled.

FIG. 6 is a schematic diagram illustrating a state in two-color molding before an elastomer is filled. FIG. 7 is a schematic diagram illustrating a state in two-color molding when the elastomer has been filled. Through a passage 70 formed in the molds, an elastomer 72 is filled in a cavity 71. However, in FIG. 7, the elastomer 72 filled in the passage 70 is not shown. The elastomer 72 is filled in the cavity 71, and the elastomer 72 in the cavity 71 solidifies, whereby the outer member 21 is formed. An end surface of the outer member 21 positioned on the other side in the radial direction abuts on a step surface 204 formed at the boundary part of the thin part 201a and the thick part 201b, and hardly protrudes in the radial direction from the base member 20. Therefore, the other end side of the outer member 21 in the axial direction is unlikely to peel off the base member 20.

In the present embodiment, as shown in FIG. 6 and FIG. 7, the passage 70 to be filled with the elastomer 72 is disposed on the inner side of the base member 20 in the radial direction. Also, the elastomer 72 is filled in the cavity 71 through the through-holes 2011. In other words, the through-holes 2011 are injection holes for injecting the material to form the outer member 21. According to the present embodiment, it is possible to fill the elastomer from the inner side of the base member 20, thereby forming the outer member 21. Therefore, any gate mark does not remain on the outer circumference of the outer member 21, and thus it is possible to improve the beauty of the external appearance of the outer member 21. However, protruding parts 211 to be described below have gate marks.

As shown in FIG. 5, the outer member 21 has the protruding parts 211 extending inward in the radial direction and passing through the through-holes 2011. The protruding parts 211 are formed during two-color molding. In the present embodiment, since the number of through-holes 2011 is two, the number of protruding parts 211 is also two. The two protruding parts 211 are disposed at an interval of 180 degrees in the circumferential direction. However, the number of protruding parts 211 is not limited to two. It is preferable that a plurality of protruding parts 211 be formed at intervals in the circumferential direction, and it is more preferable that the number of protruding parts is an even number. It is preferable that the plurality of protruding parts 211 be disposed at regular intervals in the circumferential direction. The shape of the protruding parts 211 is not particularly limited, and may be, for example, a rectangular shape or a circular shape as seen in a plan view taken as seen from the radial direction. In the present embodiment, the protruding parts 211 are rectangular as seen in a plan view taken as seen from the radial direction.

As shown in FIG. 3 to FIG. 5, the inner member 22 is disposed on the inner side of the base member 20 in the radial direction. In the present embodiment, the inner member 22 is cylindrical. The inner member 22 extends in the axial direction. Since the inner member 22 is cylindrical, it is possible to further dispose other members on the inner side of the inner member 22 in the radial direction. In the present embodiment, the operation button 3 is disposed on the inner side of the inner member 22 in the radial direction.

The inner member 22 is specifically a decorative member. In the present embodiment, the inner member 22 is a coated member made by performing a surface coating process. The coating process is performed, for example, on the surface of ABS resin. Since the inner member 22 configured with a coated member is installed, it is possible to improve the beauty of the operation device 1.

The inner member 22 specifically has a flange part 220 at an end part on the one side (the front side) in the axial direction. The flange part 220 abuts on surfaces of the base member 20 and the outer member 21 positioned on the one side in the axial direction. The annular surface 203 faces an end surface of the inner member 22 positioned on the other side in the axial direction. In the present embodiment, end surfaces of the annular surface 203 and the inner member 22 positioned on the other side in the axial direction abut on each other. The length of the inner member 22 in the axial direction is larger than that of the outer member 21. Therefore, it is possible to improve the strength of the inner member 22. However, in terms of electrical properties, it is preferable that the length of the inner member 22 in the axial direction be smaller than that of the base member 20.

Also, it is preferable that the annular surface 203 have an uneven pattern. Specifically, it is preferable that the uneven pattern be a fine uneven pattern. In this case, it is possible to suppress abnormal noise from being produced by contact between the base member 20 and the inner member 22.

The inner member 22 has hook fitting parts 221 to be engaged with the hook parts 2012. By engagement of the hook parts 2012 and the hook fitting parts 221, the inner member 22 can be coupled to the base member 20. In the present embodiment, the inner member 22 has two hook fitting parts 221 disposed on the outer circumferential surface at regular intervals in the circumferential direction. The hook fitting parts 221 are recesses formed so as to be hollow from the outer circumferential surface of the inner member 22 to the inner side in the radial direction. In some cases, the hook fitting parts 221 may be through-holes formed through the inner member 22 in the radial direction.

As shown in FIG. 3, in the outer circumferential surface of the inner member 22, grooves 222 are formed so as to be hollow inward in the radial direction and extend in the axial direction. In the present embodiment, the grooves 222 extend from the end of the inner member 22 positioned on the other side in the axial direction toward the end positioned on the one side in the axial direction. The grooves 222 are engaged with the first ribs 2013 formed in the base member 20. The grooves 222 determines the position of the inner member 22 relative to the base member 20 in the circumferential direction.

As described above, the inner member 22 is coupled to the base member 20 by engagement of the hook parts 2012 and the hook fitting parts 221. In the present embodiment, in this state, as shown in FIG. 5, the protruding parts 211 abut on the inner member 22. Specifically, the outer circumferential surface of the inner member 22 abuts on the plurality of protruding parts 211 disposed at intervals in the circumferential direction. Therefore, it is possible to fix the inner member 22 such that the inner member does not move.

In the present embodiment, it is possible to easily couple the base member 20 and the inner member 22 using the hook parts 2012 and the hook fitting parts 221. Further, by the protruding parts 211 of the outer member 21, it is possible to prevent the inner member 22 from moving with respect to the base member 20. Therefore, it is possible to prevent backlash from being caused between the base member 20 and the inner member 22 by vibration of the vehicle, thereby preventing occurrence of abnormal noise. According to the present embodiment, it is also possible to avoid repeating some actions such as the action of setting conditions for forming the base member 20, the inner member 22, and so on with molds, many times, in order to prevent abnormal noise. Although vibration of various vibration frequencies is likely to be applied to the in-vehicle operation device 1, since backlash is suppressed by the protruding parts 211, it is possible to prevent occurrence of abnormal noise.

Also, in the present embodiment, since it is not required to use, for example, an adhesive or an additional member such as a double-sided tape to fix the inner member 22 to the base member 20, it is possible to suppress increase in the number of components. Further, in the present embodiment, since it is also not required to fix the inner member 22 by welding, it is possible to achieve both of excellence in the design of the operation device 1 and prevention of abnormal noise.

<2. Modifications and Others>

The configurations of the embodiment and modifications disclosed in this specification are just examples of the present invention. The configurations of the embodiment and modifications may be appropriately modified within the technical idea of the present invention. Also, a plurality of embodiment and modifications may be combined within an allowable range.

For example, one and the other one of the base member 20 and the inner member 22 need to have hook parts and the other one, respectively. In the present embodiment, the base member 20 has the hook parts 2012, and the inner member 22 has the hook fitting parts 221. On the contrary, the base member 20 may have hook fitting parts, and the inner member 22 may have hook parts. In either case, it is possible to easily couple the base member 20 and the inner member 22. Also, in the case where hook fitting parts are formed in the base member 20, the through-holes 2011 and the hook fitting parts may be aligned in the axial direction.

Also, in the above description, the base member 20 and the outer member 21 are integrated by two-color molding. However, the present invention is not limited thereto, and the outer member may be mounted on the base member 20, for example, manually or by other methods. In this case, the outer member having the protruding parts on the inner circumferential surface may be configured with an elastic member of, for example, rubber.

Also, in the above description, the inner member 22 is formed in the cylindrical shape. This is also an example. For example, the present invention can be applied to a configuration in which the operation device 1 does not include the operation button 3. In the case where the operation device 1 does not include the operation button 3, the inner member may not be cylindrical. For example, the inner member may have other shapes such as a columnar shape. Also, for example, the rear surface side of the cylindrical base member in the axial direction may be blocked. In these cases, the configuration of the support 4 for supporting the operation knob 2 may also be appropriately modified.

Also, in the above description, the case where the present invention is applied to an in-vehicle operation device has been exemplified. However, the present invention is not limited to in-vehicle operation devices, and can be widely applied to electric devices having operation units. For example, the present invention can also be applied to home AV systems, game consoles, remote controllers, portable communication devices, and so on.

What is claimed is:

1. An operation device comprising:
an operation knob rotatable on an axial line, configured to include:
a cylindrical base member extending in an axial direction;
a cylindrical outer member disposed on an outer side in a radial direction of the base member; and
an inner member disposed on an inner side in the radial direction of the base member,
wherein the cylindrical outer member has protruding parts extending inward in the radial direction and abutting on the inner member via through-holes formed through the base member in the radial direction.

2. The operation device according to claim 1, wherein one of the cylindrical base member and the inner member has hook parts, and the other one has hook fitting parts to be engaged with the hook parts.

3. The operation device according to claim 2, wherein the through-holes are aligned with either the hook parts or the hook fitting parts in the axial direction.

4. The operation device according to claim 1, wherein the protruding parts are arranged at intervals in a circumferential direction.

5. The operation device according to claim 1, wherein the cylindrical outer member is a member softer than the cylindrical base member.

6. The operation device according to claim 1, wherein the through-holes are injection holes for injecting a material to form the cylindrical outer member.

7. The operation device according to claim 1, wherein the inner member is cylindrical.

8. The operation device according to claim 7, wherein the inner member is a coated member made by performing a surface coating process.

9. The operation device according to claim 7,
wherein inside the cylindrical base member, an annular surface to face an end surface of the inner member positioned on one side in the axial direction is formed, and
wherein the annular surface has an uneven pattern.

10. The operation device according to claim 7, further comprising:
an operation button disposed on the inner side of the inner member in the radial direction; and a support supporting the operation knob such that the operation knob is rotatable and supporting the operation button such that the operation button is movable in the axial direction.

11. The operation device according to claim 10, wherein the support is an encoder.

12. The operation device according to claim 1, wherein the operation device is an in-vehicle operation device.

* * * * *